Patented July 14, 1942

2,289,569

UNITED STATES PATENT OFFICE 2,289,569

POWDER METALLURGY

Alfred L. Boegehold, Detroit, Mich., assignor to General Motors Corporation, Detroit, Mich., a corporation of Delaware No Drawing. Application May 7, 1941, Serial No. 392,310

5 Claims. (Cl. 75—22)

This invention relates generally to powder metallurgy and more particularly to low melting point alloy powders and to the usage of the low melting point alloy powders in the formation of sintered articles.

One object of the present invention is to provide a process of producing sintered objects of powdered metals and alloys in which the sintering temperatures may be lower than those now ordinarily employed.

Another object of this invention is to provide a stronger sintered article than those resulting from sintering processes in which the sintering temperature is less than the melting point of any portion of the material.

It is also an object of this invention to provide a low melting bonding material, or one having a low melting constituent, composed of a combination of alloying elements that are advantageous in the sintered article, especially a bonding material of this character that is readily comminuted or ground to the powder size desired.

A specific object of the invention has to do with a nickel-silicon alloy powder of specific analysis and to its usage in the formation of sintered articles.

Other objects and advantages of the present invention will become more apparent as the description proceeds.

In accordance with the invention a higher melting metal or alloy powder constituent of any suitable kind is mixed with a requisite and ordinarily rather small proportion of a comparatively brittle alloy powder material that has a constituent that is molten at a desired sintering temperature below the melting point of the higher melting point powder material and which acts as a bonding material. Constituents of the brittle alloy diffuse into the higher melting point powder material during the sintering operation, and the composition of the alloy powder is so selected as to form desirable alloys with the higher melting point material during the sintering operation. As the diffusion proceeds the composition of the brittle low melting alloy powder is changed so that it is no longer brittle. Preferably the low melting point alloy material has a constituent that is molten at the melting point of the eutectic formed by the several components of the alloy powder, and in order to obtain as large an amount of liquid material as possible at the lowest possible temperature it is further preferred that the composition of the low melting point alloy powder be the eutectic composition of the plurality of elements making up the alloy powder. In this latter instance, of course, the alloy material will all be liquid when heated to the melting point of the eutectic. In the case of alloy powders having no eutectic composition, the proportions of the alloying elements may be selected to provide a sufficiently low melting point to allow a sintering temperature well below the melting point of the high melting point powders. In practice, it is preferred that temperatures somewhat above the melting point of the eutectic or lowest melting point constituent be used. The mixture of powders of high and low melting points is formed into a desired shape, either by compressing the powder into a briquette, or, if desired, in some cases, without the use of pressure by using suitable molds, and is thereafter heated to a sintering temperature as described. As the fusion of the low melting point alloy powder particles occurs it acts as a bonding material to secure the particles in the briquetted powder. Constituents in the low melting point alloy diffuse into the other powder particles in the briquette upon continued heating so that a strong article of homogeneous composition and structure is formed.

The low melting point alloy to be used in accordance with this invention in any particular instance is chosen so that the melting point is lower than that of the powder particles to be bonded thereby, or in any event will have a constituent which is molten at a temperature below the melting point of the material to be bonded. The low melting point alloys herein are quite brittle and friable and consequently are rather easily broken up into powder form in any suitable comminuting or grinding device. A ball mill of common form conveniently may be used for this purpose.

The sintering operation is preferably carried out under non-oxidizing conditions, as in a gas atmosphere containing carbon monoxide. The pressures used in the briquetting operation are on the same order as those now commonly employed. For example, pressures up to about 100,000 pounds per square inch, or even higher, may be used. Pressures of from about 40,000 to 60,000 pounds per square inch are commonly used in the commercial production of briquetted and sintered articles. The time of sintering will vary with the temperatures employed, as well as with the specific materials in the powder mixture and the extent of diffusion desired, but in general the times are comparable with those now used in the formation of articles from sintered powders.

Sintering times of from about one-half hour to about two hours have been employed. The powder size may be substantially the same as that of sizes now used in the formation of sintered articles. If desired, the low melting point alloy powder may be ground to a size that is smaller than the powder to be bonded thereby.

The low melting point alloy may be composed of two or more elements or constituents. While ordinarily the major portion of the higher melting point powder material that is to be bonded by the low melting point alloy powder is composed subtsantially entirely of a single element such as iron, nickel, copper, etc. it is contemplated that higher melting point alloy powders may also be bonded together by the lower melting point alloy powder in the sintering operation. Also, the low melting point alloy powder may be used to bond a plurality of separate higher melting point materials.

An example of a low melting point alloy bonding agent in accordance with the invention that has been used with success in bonding both ferrous and non-ferrous metal powders is a brittle nickel-silicon alloy powder of lower melting point than that of the ferrous metal powder or of the non-ferrous metal powder to be bonded thereby. In general, it is contemplated that about 22% silicon to about 50% silicon and the balance nickel may constitute the composition of the alloy where the nickel-silicon alloy is to act as a bonding material for use in forming articles of sintered iron powder. Where the nickel-silicon powder is to be used to bond copper powder particles together the composition is preferably about 24% to 45% silicon, with the remainder substantially all nickel. All of the last mentioned compositions possess liquid constituents below the melting point of copper which is 1982° F. For obtaining complete liquation of the nickel-silicon alloy powder at sintering temperatures of below 1800° F. the composition of the low melting nickel-silicon alloy may be either about 28–30% silicon, or about 37–40% silicon, with the balance nickel. In the nickel-silicon alloys containing between about 25% to about 42% silicon there is a constituent which is molten at a temperature of about 1770° F.

Various amounts of tin may be added to the nickel-silicon alloy to form a brittle ternary alloy having a still lower melting point. Small amounts of phosphorus up to about 2% may be added in certain applications. Small amounts of active metals such as sodium may be added in order to affect the wetting properties of the alloys when in molten condition. Small and minor amounts of various impurities such as, for example, iron, also may be present. Good results have been obtained with nickel-silicon alloys containing about 2% iron.

As a specific example of procedure in forming sintered articles using the nickel-silicon bonding material, a mixture of 90% of iron powder of a size that would all pass through a 150 mesh screen, and 10% of nickel-silicon powder containing 28% silicon and the balance nickel plus minor amounts of impurities such as iron, was briquetted at a pressure of 50,000 pounds per square inch and sintered at a temperature of 2000° F. in a non-oxidizing atmosphere. The article had a strength of about 25,000 pounds per square inch.

In another case, a mixture composed of 10% of the nickel-silicon alloy powder of 28% silicon content, 5% of a copper-tin alloy powder (40% tin and the balance copper plus minor amounts of impurities) and 85% of copper powder, was briquetted at a pressure of 50,000 pounds per square inch and sintered at 1700° F. in a non-oxidizing atmosphere. The sintered article had a strength of 40,000 pounds per square inch and had extremely good properties as regards resistance to scoring. In this example the copper-tin alloy powder provides the molten constituent at the sintering temperature of 1700° F.

Good results also have been obtained with the examples given in the following table:

| Copper powder | Nickel-silicon alloy powder composed of 72% nickel and 28% silicon | Copper-tin alloy powder composed of 60% copper and 40% tin |
| --- | --- | --- |
| Per cent | Per cent | Per cent |
| 95 | 5 | -------- |
| 90 | 10 | -------- |
| 95 | -------- | 5 |
| 90 | -------- | 10 |
| 95 | 2.5 | 2.5 |
| 85 | 10 | 5 |
| 85 | 7.5 | 7.5 |
| 85 | 5 | 10 |

In each of the examples the sintering temperature was less than the melting point of copper and high enough to provide a molten component in the bonding material.

Various changes and modifications may be made in the embodiments of my invention disclosed herein without departing from the principle of my invention and I do not intend to limit the patent granted thereon except as necessitated by the prior art.

I claim:

1. A process of forming a sintered article of powdered materials which comprises, forming a brittle alloy material composed essentially of nickel and silicon and having a component that is molten at a relatively low temperature, the silicon content in said alloy being not less than about 22% and not greater than about 50% with the remainder of said alloy substantially nickel, comminuting said brittle alloy into powder form, mixing a relatively small proportion of the alloy powder with powdered material having a melting point higher than that of said low melting component, briquetting said powder mixture into the form desired, and sintering the briquette at a temperature lower than the melting point of the powder of higher melting point and at least as high as the melting point of the component melting at the relatively low temperature.

2. A process as in claim 1, in which the higher melting point powder is composed largely of iron.

3. A process as in claim 1, in which the higher melting point powder is composed substantially entirely of copper and the nickel-silicon alloy powder is composed of 24–45% silicon and the remainder substantially nickel.

4. A process of forming a strong sintered article of powdered materials which comprises, forming an alloy powder composed of about twenty-eight percent silicon and the balance substantially nickel, intimately mixing about ten parts of said alloy powder with about ninety parts of metal powder having a higher melting point than said alloy powder, briquetting the metal powder mixture into the shape desired and sintering said shape under non-oxidizing conditions at a temperature at least as high as the melting point of the nickel-silicon alloy powder and below the melting point of said powder having the higher melting point.

5. A process of forming a strong sintered article of powdered materials which comprises forming an alloy powder composed of about twenty-eight percent silicon and the balance substantially nickel, intimately mixing about ten parts of said alloy powder with about ninety parts of ferrous metal powder, briquetting said mixture into the form desired and sintering said briquette under non-oxidizing conditions at a temperature of about 2000° F.

ALFRED L. BOEGEHOLD.